Oct. 19, 1965    N. SCHMELZER, JR    3,212,210
MINNOW BUCKET
Filed June 11, 1962
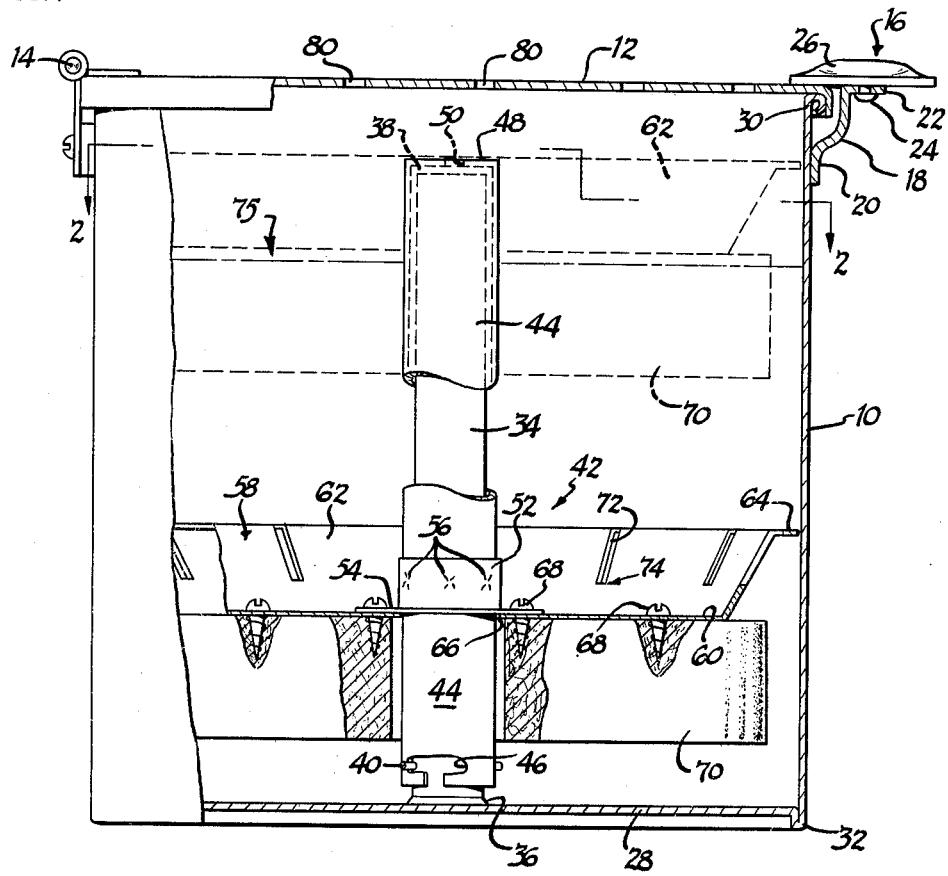
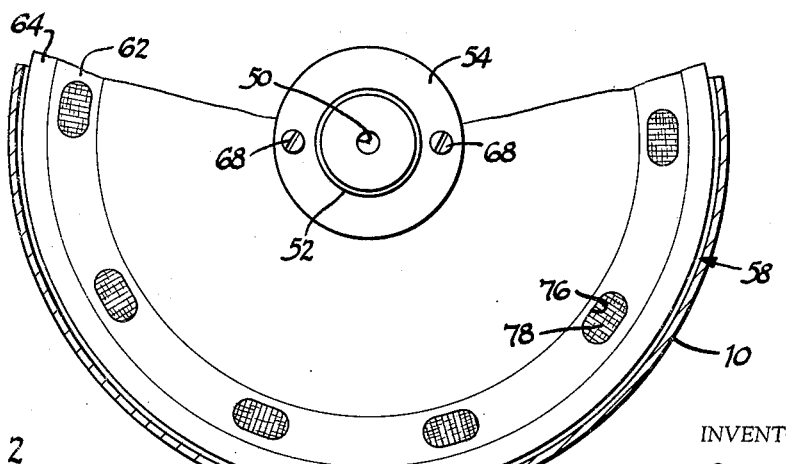
INVENTOR.
BY *Nickolas Schmelzer, Jr.*
*Wilson, Settle & Craig*
*Attorneys*

United States Patent Office 3,212,210
Patented Oct. 19, 1965

3,212,210
MINNOW BUCKET
Nickolas Schmelzer, Jr., 25618 Kitch Ave., Inkster, Mich.
Filed June 11, 1962, Ser. No. 201,580
1 Claim. (Cl. 43—57)

This invention relates to a novel minnow bucket, and more particularly to a minnow bucket providing automatic, semi-automatic or manual delivery of the bait to the fisherman's hand from the aqueous environment in which the bait is kept; and also providing semi-automatic aeration of the aqueous environment with each use of bait.

As is well known, minnows are often used for live bait in fishing. Unless the water in which the minnows are kept is maintained in an aerated condition, the minnows will lose vigor and die. Also, it is well known that the conventional minnow bucket, to help overcome this condition, is of large size to accommodate a substantial body of water in proportion to the minnows, to retain a sufficient amount of oxygen over at least a reasonable fishing period to preserve the life of the minnows. However, even under this condition, the minnows rather quickly consume the available oxygen, lose vigor, and will die because of lack of oxygen replenishment.

It is also well known and understood that when minnows are kept in a large body of water they are difficult to catch for baiting the hook.

These difficulties, if overcome by an improved minnow bucket capable of providing exposure of the minnows for ready access to the hand of the fisherman for baiting purposes, and also providing aeration of the retaining water, would present a substantial advance in the art.

Accordingly, it is an important object of the present invention to provide an improved minnow bucket.

A further object is to provide an improved minnow bucket wherein live minnows are permitted to normally swim in a reasonable body of water, but are screened into a very small body of water for exposure to the hand of the fisherman for baiting purposes.

A further object is to provide a minnow bucket wherein each use of the bait provides aeration of the aqueous environment, and thus keeps the minnows in a vigorous condition.

Other objects of this invention will appear in the following description and appended claim, reference being had to the accompanying drawings forming a part of this specification wherein like reference characters designate corresponding parts in the several views.

On the drawings:

FIGURE 1 is an elevational view, partially in section, of an improved minnow bucket made in accordance with the present invention with the float and strainer in a solid line storage position and also in a dotted line use position;

FIGURE 2 is a partial plan view taken along the line 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

Briefly, the present invention relates to an improved minnow bucket providing for the storage of live minnows in a substantial body of water for freedom of movement and vigorous condition. For use by the fisherman, in one embodiment of the invention, the minnows are raised in semi-automatic manner by a floatable strainer which retains the minnows in a semi-exposed position in a shallow body of water so that the fisherman can catch them easily. After procuring his bait, the fisherman then returns the float and strainer to storage position and by so doing semi-automatically aerates the body of water to provide an ideal environment in which the minnows are retained for storage.

In view of the foregoing, a complete description of the invention now follows.

THE INVENTION

*The outer container*

As shown in the drawings, the outer container comprises an ordinary bucket or pail 10 having a lid 12 that is hinged at 14. The lid is optionally provided with a suitable hold-down lock at 16, comprising a bracket 18, spot-welded as at 20. The bucket 18 includes a horizontally disposed upper arm 22, apertured to receive a rivet 24, having the upper end fitted into a suitable aperture of a spinner-type hold-down element 26. From the foregoing description, it will be evident that the hold-down element 26 is of elongated configuration and when turned is either clear of the periphery of the lid 12 or overlies the edge of the lid 12 in a locking relation as shown, depending upon its position.

The bucket or pail 10 is provided with a bottom at 28, and rolled edges are provided at 30 and 32 for strength.

*The center support column*

Centrally of the bottom 28 of the bucket or pail 10 there is provided a central support 34, suitably of tubular configuration for strength yet light weight. The support 34 is fastened at the bottom end by means of a weld or brazed joint 36. The central support 34 is closed by top transverse wall 38. Adjacent the bottom, the central support 34 is provided with a transverse pin 40 for a purpose to be later described. Of course, it will be understood that the support 34, instead of being a closed tube can also comprise a solid rod, and that multi-sided and round configurations are encompassed within the scope of this invention.

*The automatic float and strainer*

The central support column 34 has a dual purpose:
(1) To support the automatic strainer; and
(2) To comprise one of the components of a semi-automatic aerating pump.

To elaborate, upon the central support 34, a float and strainer assembly 42 is mounted for operation, i.e. axial movement. The float and strainer assembly 42 is built around a tube 44, of a diameter and contour to telescope over the central support 34. At the bottom the tube 44 is provided with a bayonet slot 46, operable with the pin 40 to provide a hold-down lock. At the top, the tube 44 is closed by a transverse wall 48, having an aperture 50 therein. Aperture 50 serves as an air vent aperture and its function will be later described.

Intermediate the ends of the tube 44, but adjacent or near the bottom, there is provided a tubular sleeve 52 having a radially extending, annular flange 54, suitably formed at its bottom end. The tubular sleeve 52 is held in position suitably by spot welding as at 56.

The purpose of sleeve 52 and its annular flange 54 is to support the float and strainer assembly 42 to the tube 44. The automatic float and strainer assembly 42 comprises a pie plate like strainer 58 having a disc-like bottom wall 60 and an inverted frusto-conical sidewall 62 with a radially extending annular flange or edge 64.

The bottom 60 is provided centrally with an opening 66 to slidably accommodate the tube 44. The annular flange 54 of the tubular sleeve 52 is placed in abutting relation with an annular portion of the bottom 60, surrounding the opening 66. Screws 68 or other suitable fastening, such as spot welding, is provided to secure the flange 54 and the bottom 60 in assembled relation.

To the bottom side of the disc-like bottom wall 60 of the pie plate like strainer 58, there is provided an annular 70 of floatation material, such as cork, polystyrene foam, a balsa wood block or the like. Fastening can be effected by any suitable means; however, for illustration purposes screws 68 are shown piercing the bottom wall 60 and penetrating the annulus 70. The block 70, of course, can be attached to the tube 44 only and yet accomplish its desired lifting purpose.

Referring again to the pie plate like strainer 58, it will be noted that a plurality of axially oriented slots 72 are circumferentially spaced around the frusto-conical wall 62. These slots extend from the top of the wall 62 to a point 74 above the bottom wall 60 and permit all but a desired layer of water to drain from the frusto-conical wall 62. Thus, when the strainer 58 is lifted to the surface of the water contained within the bucket 10, by the buoyant effect of the annulus 70, the slots 72 permit the water above the point 74 to drain from the wall 62. This will leave the minnows in a shallow pool of water where they can be quickly and easily dipped up by the fisherman's hand. This is shown in the dotted outline position with the float and strainer assembly 42 raised to the surface, the strainer 58 being exposed above the water level 75.

*The lock-down feature*

From the foregoing, it will be noted that the pin 40 cooperates with the T-slot 46, so that when given a partial turn in either direction, the tube 44 can be locked and the float and strainer assembly 42 held in the bottom, solid-line storage position. For use, the fisherman opens the lid 12, turns the tube 44 to release position and the float 70 carries the strainer upwardly to the dotted line position, to deliver the bait to the fisherman.

When using the lockdown feature of tube 44, pin 40 and slot 46, the hold-down lock mechanism 16 is not actually necessary. This means that the bucket 10 can be produced more cheaply.

At this point, discussion is pertinent as regards another embodiment of the invention wherein the holddown lock feature 16 may be utilized, however, to provide automatic lifting of the float and strainer assembly 42 by opening lid 12.

*The automatic lift embodiment*

If we presume that the pin 40 and T-slot 46 are omitted, it will be understood that the float and strainer assembly 42 will automatically rise to the dotted line position when the lid 12 is opened. Thus, the lid 12 will bear against the transverse wall 48 of the tube 44 to hold the float and strainer assembly 42 down at the solid line position. If the lid 12 is made of sufficiently heavy gauge material, the weight of the lid will be effective to hold the automatic float and strainer assembly 42 at the solid line submerged position and the hold down lock 16 may be optional. However, if lighter gauge stock is utilized, it may be desirable to use the holddown lock assembly 16 to keep the float and strainer 42 firmly down.

In this embodiment of the invention, it will be evident that when the lid is opened, the float and strainer assembly 42 will rise to bring the bait to an exposed position as described above.

*Alternate strainer structure of FIGURE 2*

Instead of the slots 72, as indicated in FIGURE 1 in the frusto-conical sidewall 62 of the pie plate like strainer 58, holes 76 may be provided at a suitable distance above the bottom 76 in the frusto-conical wall 62 as illustrated in FIGURE 2. The holes 76 may be set during manufacture to leave a desired amount of water in the bottom 60 of the strainer 58, as by the slots 72.

Regarding this feature, it may be desirable in some instances for use with larger minnows, to omit the drain feature of either slots 72 or holes 76 and merely design the strainer unit of desired depth and close fit to the side of the bucket 10. However, it will be understood that when such a close fit is provided, to prevent escape of the minnows below the edge 64, water passage will be slowed down, thus retarding axial movement of strainer 58. Thus, the drain feature provides more rapid passage of water from above the strainer 58 to a point below or vice versa as the strainer moves axially.

In using the holes 76, of course it will be understood that these must be of a smaller size than the minnows to prevent escape of the minnows through the wall 62 to a point below the strainer 58. In deluxe versions of the present invention, it may be desirable to provide larger holes 76 with protective screens.

OPERATION OF THE INVENTION

For operation, the lid 12 is opened, the float and strainer assembly 42 removed and water applied to the level line 75. The float and strainer assembly 42 is then inserted by telescoping tube 44 over tube 34 and, where a pin and slot 46 are employed, pushed to the bottom and locked in position. Thereafter, minnows are applied to the substantial volume of water above the unit 42 to the water level line 75.

In use during fishing, the tube 44 is given a partial turn to release it from the latched position at 40, 46. It will be obvious that after initial unlatching, closing the lid 12 will keep the unit 42 at the bottom, however, with a heavy lid. Then, during fishing, when the lid is opened, the float 70 raises the strainer 58 to the top and the water passes out through the drain slots 72 to about three-eighths or one-half inch level, thus raising the minnows automatically to the top of the water when the lid is opened. The fisherman then selects a minnow, puts his finger on the aperture 50, and presses the assembly back to the bottom of the container, and closes the lid.

When the float and strainer assembly 42 rises to the dotted position, it will be evident that the outer tube 34 rises above the inner tube 44 and that as it so rises, air will enter through the aperture 50 to fill the tube 44. When the fisherman has baited his hook and is ready to close the minnow bucket of the present invention, he presses his finger over the hole 50, trapping air within the tube 44 and when he pushes down on the tube 44 to return the float and strainer 42 to the solid line position, the trapped air will be forced downwardly between tubes 44 and 34 by telescoping pumping action and issue from the bottom of the tube 44 to rise upwardly and aerate the water in the bucket 10. Therefore, each time the bucket is used, the water will be aerated to keep the minnows in a vigorous condition.

EXTENDED SCOPE OF INVENTION

Materials of construction

Materials of construction applicable to use in the present invention comprise coated metal, such as tinplate, galvanized or the like of a reasonably corrosive-resistant nature against the effect of fresh water. Of course, brass and similar more expensive materials can be used, but for reasons of economy, plated iron may be preferred. Of course, aluminum and plastics are also adapted to use in the broad scope of invention.

The float

As previously mentioned, the float annulus 70 can be polystyrene foam, cork, or other buoyant material.

Instead of the float element 70, a suitable spring could be used as the force for raising the strainer basket 58 to the top when the lid is opened or the lock 40, 46 released.

Also, though not shown, it is within the scope of invention to omit the float for less deluxe versions of the invention. By so operating the strainer is actuated by the fisherman raising tube 44 and strainer 58 with one hand and selecting the delivered bait with the other hand; then actuating pump 50, 48, 44, 34, with his finger when the strainer is returned to solid line position.

*Bale for bucket*

Although not shown on the drawings, it will be obvious that a conventional bale may be applied to the bucket of the present invention for convenience in carrying.

*Top air holes*

Also, it is within the scope of the invention to provide air holes 80 in the top so that the sloshing of the water within the bucket will provide at least some aerating effect during lulls in fishing, as when there is little use of the aerating pump feature of the present invention because of non-use of bait entailing raising the strainer 42 and pump 50, 44, 34.

*Optional strainer configuration*

The strainer 58 can be made entirely of screen or optionally have an imperforate dish-like base with the upper portion of wall 62 of screen to provide a drain feature.

It might also be desirable in some instances to make the strainer of simple disc configuration and optionall provide an abutting stop near the top of bucket 10, cooperative with a water level line to screen the minnows to a small body of water for catching. In such embodiment a disc of screen could be used for water passage; or slots or screened holes provided. Or, the sliding clearance between the periphery of the disc and the side wall of bucket 10 could serve as a slower water passage.

*The air vent 50*

The air vent 50 can be near the top of tube 44 as well as in the transverse wall 48. Instead of walls 38 and 48, the tops of tubes 34 and 44 can be crimped together for closure.

*Transverse wall 38 of tube 24*

This wall may be positioned anywhere along the length of tube 34, including the bottom.

NOVEL FEATURES AND ADVANTAGES OF THE PRESENT INVENTION

It is believed obvious that the principal features of novelty and the advantages inherent in the present invention are evident from the foregoing description. However, these are briefly enumerated as follows:

(1) Automatic, semi-automatic or manual minnow-straining feature; and (2) Semi-automatic aeration of the water environment for the minnows by return of the strainer assembly to the bottom storage position, the fisherman merely applying his finger to vent hole 50.

I claim:

In a minnow bucket, a fluid container having a side wall and a bottom, a lid for said container, a closed imperforate elongated support element within the container secured at one end to said bottom, said elongated support element being closed by a transverse wall across the top, a tube telescopically slidable on said elongated support element and having a transverse wall across the top with a vent aperture in the transverse wall and terminating below said lid, said vent aperture being closable by the hand on downward movement of the tube to cause aeration of the fluid in the container, a strainer mounted coaxially on said tube, said strainer comprising an imperforate bottom wall and an upstanding side wall with openings therein above the bottom wall so that fluid is retained in the strainer at all times, a floatable element carried on the underside of said strainer, and lock means at the bottom of the elongated support element and means adjacent the bottom of the tube to engage said lock means for holding said tube in a telescoped position on said elongated support element.

References Cited by the Examiner

UNITED STATES PATENTS

| | | | |
|---|---|---|---|
| 58,976 | 10/66 | Bratt | 261—33 |
| 302,086 | 7/84 | Barton | 43—56 |
| 647,257 | 4/00 | Gray | 43—57 |
| 796,083 | 8/05 | O'Neall | 261—33 |
| 1,436,835 | 11/22 | Van Pelt | 43—56 |
| 2,600,826 | 6/52 | Allen | 43—56 |
| 2,613,843 | 10/52 | Suda | 43—56 X |
| 2,663,115 | 12/53 | McKissack | 261—121 |
| 3,000,132 | 9/61 | Koistinen | 43—56 |

REUBEN FRIEDMAN, *Primary Examiner.*

HERBERT L. MARTIN, *Examiner.*